United States Patent

Kim

[11] Patent Number: 5,973,744
[45] Date of Patent: Oct. 26, 1999

[54] APPARATUS FOR DECODING VIDEO DATA

[75] Inventor: Seong-Bong Kim, Seoul, Rep. of Korea

[73] Assignee: Samsung Electronics Co., Ltd., Kyungki-do, Rep. of Korea

[21] Appl. No.: 08/983,342

[22] PCT Filed: May 13, 1997

[86] PCT No.: PCT/KR97/00082

§ 371 Date: Apr. 10, 1998

§ 102(e) Date: Apr. 10, 1998

[87] PCT Pub. No.: WO97/43861

PCT Pub. Date: Nov. 20, 1997

[30] Foreign Application Priority Data

May 14, 1996 [KR] Rep. of Korea ...................... 96-15946

[51] Int. Cl.$^6$ .............................. H04N 7/12; H04N 7/24; H04N 7/30

[52] U.S. Cl. ........................ 348/420; 348/423; 348/845; 348/845.1

[58] Field of Search ................................. 348/420, 421, 348/423, 845, 845.1, 845.2, 403, 404, 395, 402; 364/514 A; 341/65, 67; 382/246; 358/432; H04H 7/12, 7/24, 7/30

[56] References Cited

U.S. PATENT DOCUMENTS

| | | |
|---|---|---|
| 5,107,345 | 4/1992 | Lee ........................................... 358/432 |
| 5,557,538 | 9/1996 | Retter et al. .......................... 364/514 A |
| 5,686,915 | 11/1997 | Nelson et al. ............................. 341/65 |
| 5,825,934 | 10/1998 | Ohsawa ................................... 382/246 |
| 5,828,425 | 10/1998 | Kim ........................................ 348/845 |

Primary Examiner—Bryan Tung
Assistant Examiner—Tung Vo
Attorney, Agent, or Firm—Sughrue, Mion, Zinn, Macpeak & Seas, PLLC

[57] ABSTRACT

A decoding apparatus decodes symbols and header data obtained by variable length decoding. The decoding apparatus comprises a data distributor (10) for receiving the symbols and alternately outputting blocks of the symbols via two output terminals. A header analyzer (50) receives the header data, analyzes the received header data and outputs parameters relating to restoration of the symbols. DC component decoding unit (40) detects symbols relating to DC coefficients of an intra-macroblock among the symbols output from the data distributor (10), and restores the DC coefficients of the intra-macroblock using the detected symbols and the parameters supplied from the header analyzer (50). First and second restoring units (20 and 30) which are individually connected to two output terminals of said data distributor (10) restore the symbols input from the data distributor (10) in units of a block, using the parameters generated by said header analyzer (50) and a corresponding DC coefficient of the DC coefficients produced by said DC component decoding unit (40).

5 Claims, 7 Drawing Sheets

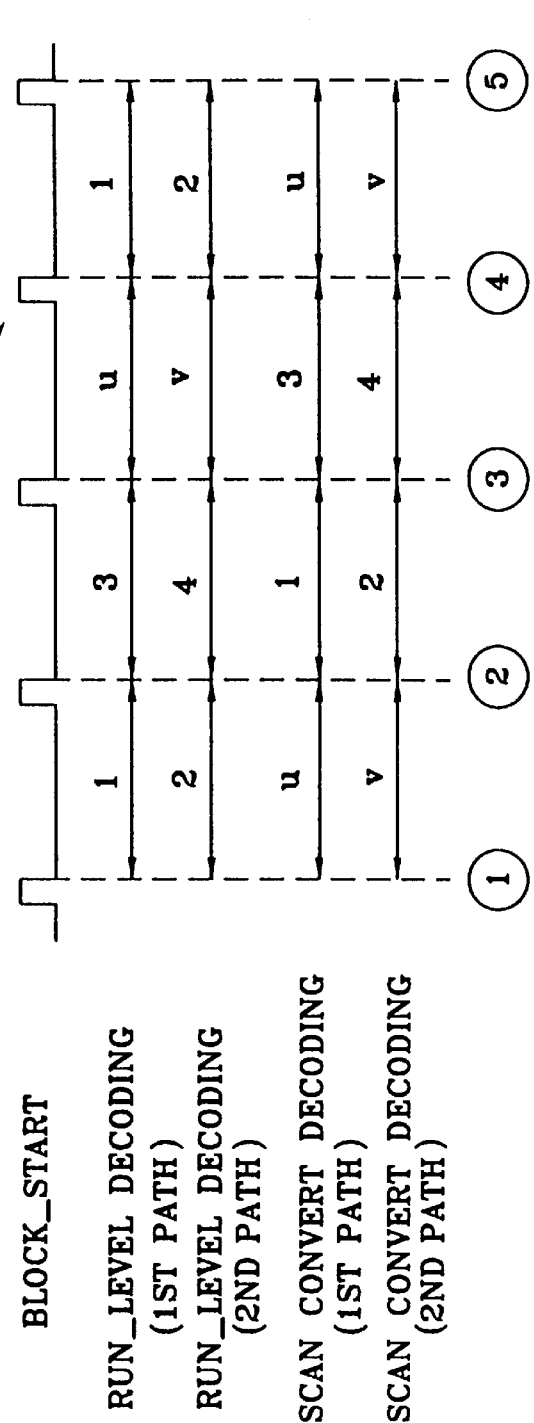
FIG. 2A  HEADER READING
FIG. 2B  DECODED_MB
FIG. 2C  MB_TYPE
FIG. 2D  MB_START_DEC
FIG. 2E  BLOCK_START
FIG. 2F  RUN_LEVEL DECODING (1ST PATH)
         RUN_LEVEL DECODING (2ND PATH)
FIG. 2G  SCAN CONVERT DECODING (1ST PATH)
         SCAN CONVERT DECODING (2ND PATH)

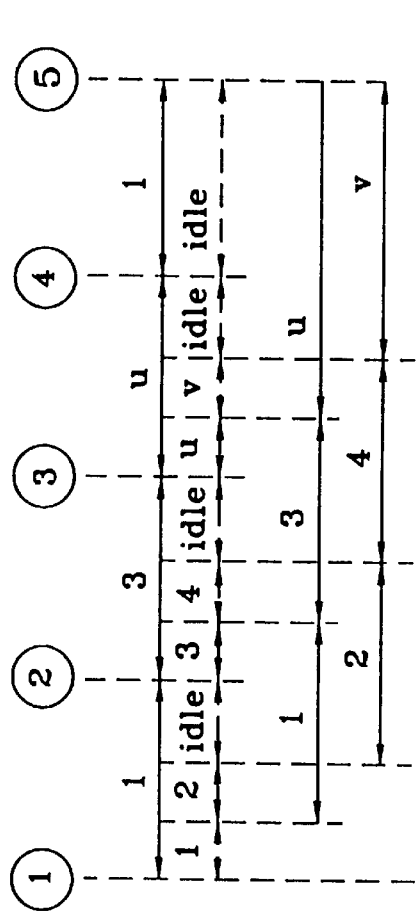
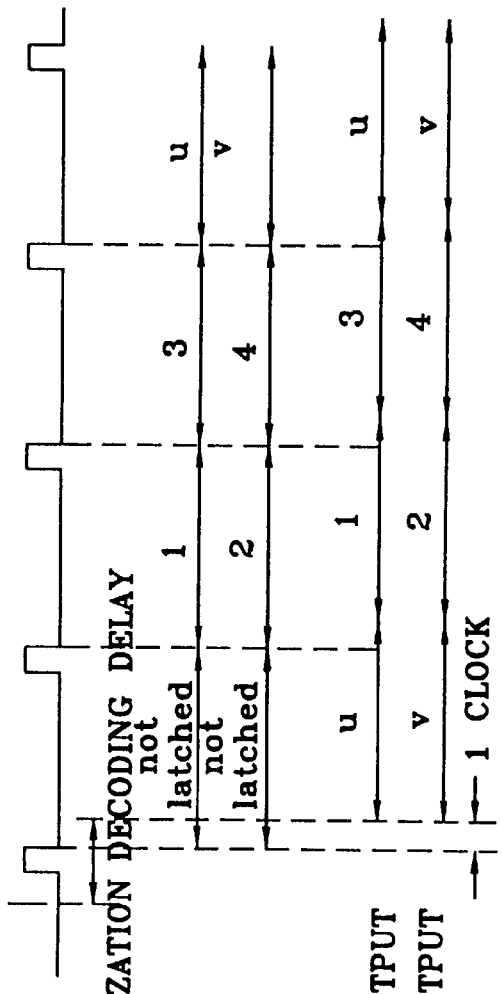
FIG.2H FIG.2I FIG.2J FIG.2K FIG.2L

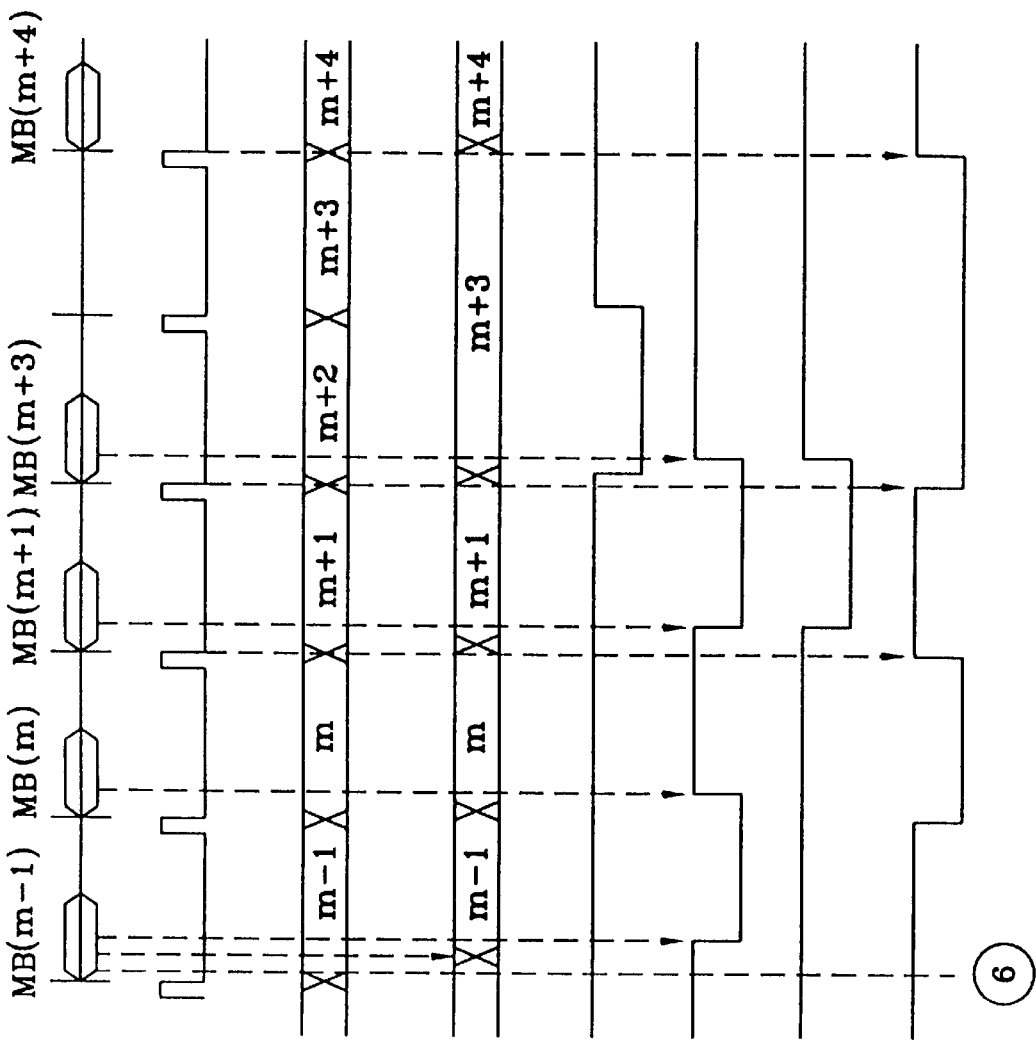

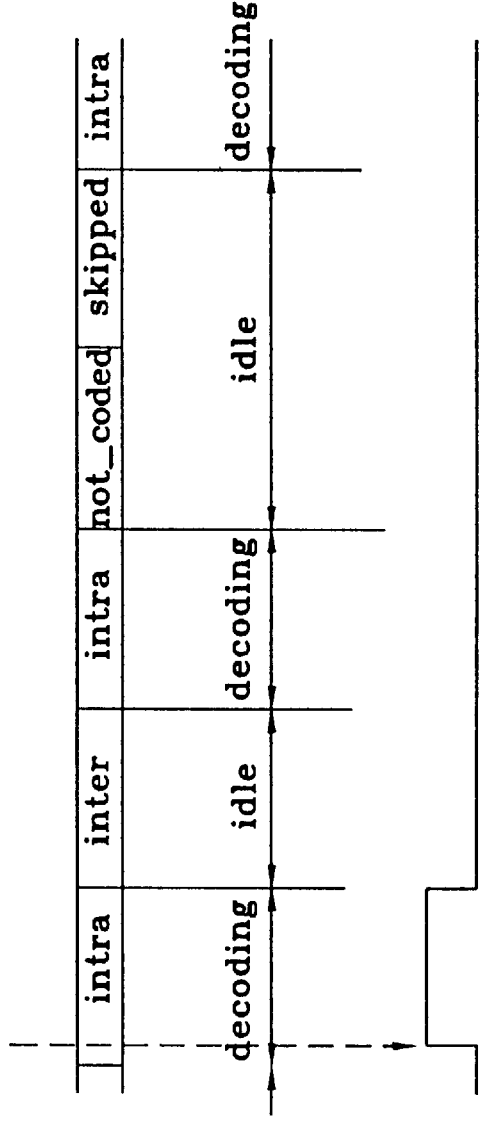

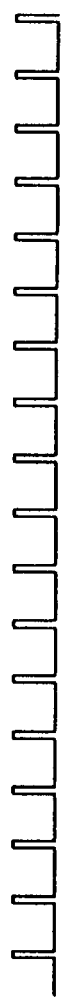
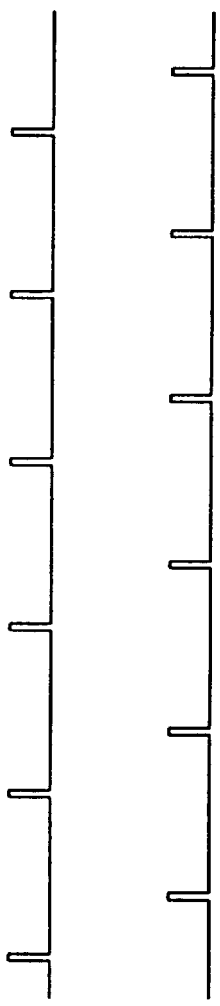
FIG.5A  BLOCK_START
FIG.5B  BLOCK_COUNT
FIG.5C  MB_START_DEC
FIG.5D  MB_START_LCH
FIG.5E  MB_INTRA_LCH

APPARATUS FOR DECODING VIDEO DATA

BACKGROUND OF THE INVENTION

The present invention relates to an apparatus for decoding video data, and more particularly, to an apparatus for decoding video data on a real-time basis by restoring DC coefficients of intra-macroblocks via a decoding path different from those for decoding other coefficients.

DESCRIPTION OF THE RELATED ART

Generally, a decoder relating to an MPEG (Moving Pictures Experts Group) standard receives a bitstream which is coded by an encoder and transmitted, and restores the received bitstream to the original data before encoding on the basis of the analysis of header information contained in the received bitstream. A general video decoder can decode data of a main level having a small amount of encoding at the operating speed of a system clock. Therefore, header information and encoded data can be processed via a single path.

However, a video decoder, such as for high-definition TV (HDTV) which processes a bitstream belonging to a main profile and high level in the MPEG standard, requires a system clock of at least 100 MHz in order to perform high-speed data processing since there is a large amount of data to be processed. It is difficult to implement such a system in hardware, and the manufacturing cost of such an implementation is excessively high.

A technique for reducing the burden of a system clock in a system for decoding video data in an HDTV is disclosed in Korean Patent Application No. 95-43583, which is by the applicant of the present invention. This prior art discloses a decoding apparatus for decoding via two paths four luminance blocks and two chrominance blocks which constitute a macroblock relating to a 4:2:0 picture format. This decoding apparatus can process a video bitstream at a high speed without increasing the speed of system clock.

SUMMARY OF THE INVENTION

It is an object of the present invention to provide an apparatus for decoding video data in which, among data output from a variable length decoder, data involving DC coefficients of an intra-macroblock is decoded via a decoding path different from those of other coefficients. Accordingly, the apparatus according to the invention can restore the DC coefficients on a real-time basis, while reducing its decoding burden.

To accomplish the above object of the present invention, there is provided a decoding apparatus for decoding symbols and header data obtained by variable length decoding, the decoding apparatus comprising:

a data distributor for receiving the symbols and alternately outputting blocks of the symbols via two output terminals;

a header analyzer for receiving the header data, analyzing the received header data and outputting parameters relating to restoration of the symbols;

DC component decoding means for detecting symbols relating to DC coefficients of an intra-macroblock among the symbols output from the data distributor, and restoring the DC coefficients of the intra-macroblock, using the detected symbols and the parameters supplied from the header analyzer; and first and second restoring units which are individually connected to two output terminals of the data distributor, for restoring the symbols input from the data distributor in units of a block, using the parameters generated by the header analyzer and a corresponding DC coefficient of the DC coefficients produced by said DC component decoding means.

BRIEF DESCRIPTION OF THE DRAWINGS

The preferred embodiment is described with reference to the drawings wherein:

FIGS. 2A to 2L are timing diagrams for explaining the operation of the decoding apparatus of FIG. 1;

FIGS. 3A to 3L are timing diagrams for explaining the operation of a DC decoding unit;

FIGS. 5A to 5E are timing diagrams for explaining the latching operation of decoded DC coefficients.

DESCRIPTION OF THE PREFERRED EMBODIMENTS

Figure 1:
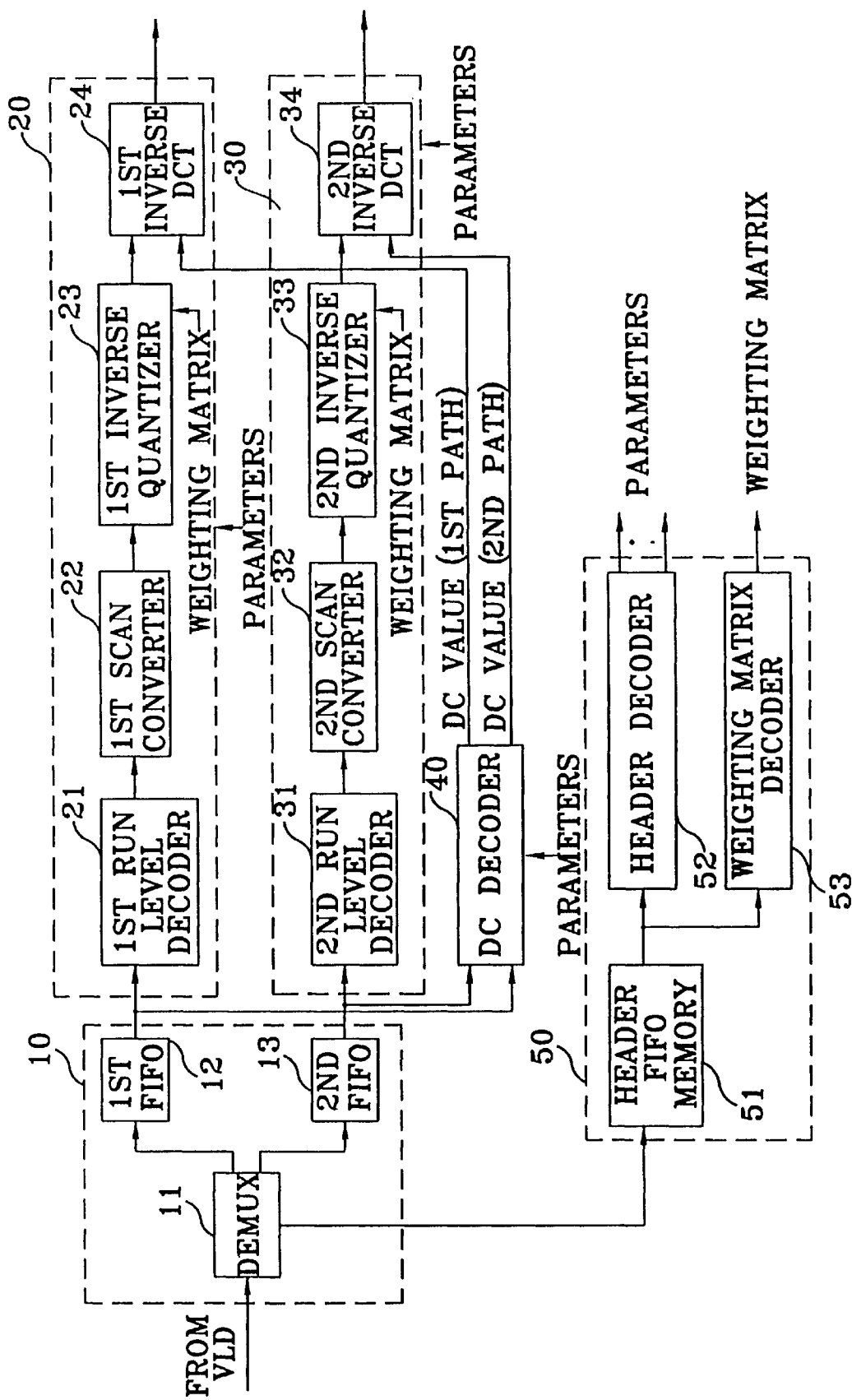
FIG. 1 is a block diagram of a decoding apparatus according to a preferred embodiment of the present invention.

Referring to FIG. 1 illustrating a decoding apparatus of the present invention, a data distributor 10 receives symbols and header data output from a variable length decoder (VLD; not shown). The data distributor 10 distributes, in units of a block on the basis of the received header data, the symbols output from the variable length decoder to a first restoring unit 20 and a second restoring unit 30, each of which consists of a first restoring path and a second restoring path. The data distributor 10 includes a demultiplexer 11 and first and second first-in-first-out (FIFO) memories 12 and 13, respectively. The demultiplexer 11 outputs the received header data to a header analyzer 50, and alternatively supplies the symbols to the first FIFO memory 12 and the second FIFO memory 13 in block units. The output of the first FIFO memory 12 is input to the first restoring unit 20, and the output of the second FIFO memory 13 is input to the second restoring unit 30. The first and second restoring units 20 and 30, respectively, restore data output from the data distributor 10 using the output data of both the DC decoding unit 40 and the header analyzer 50. The first restoring unit 20 includes a first run level decoder 21, a first scan converter 22, a first inverse quantizer 23 and a first inverse discrete cosine transformer (IDCT) 24, which are connected in sequence. The second restoring unit 30, which receives the output of the second FIFO memory 13, includes a second run level decoder 31, a second scan converter 32, a second inverse quantizer 33 and a second inverse discrete cosine transformer (IDCT) 34, which are connected in sequence.

The DC decoding unit 40 restores DC coefficients of an intra-macroblock from the output data of the first and second FIFO memories 12 and 13, respectively, using parameters output from the header decoder 52. Using the DC decoding unit 40, the apparatus of FIG. 1 can reduce the burden of signal processing on the first and second restoring units 20 and 30, respectively. The DC decoding unit 40 receives the outputs of the first and second FIFO memories 12 and 13, respectively, and of the header analyzer 50, and restores the DC coefficients of blocks belonging to the intra-macroblock using the received data. The header analyzer 50 includes a header FIFO memory 51 for storing header data output from the demultiplexer 11, a header decoder 52 and a weighting matrix decoder 53. The header decoder 52 generates parameters involving the restoration of data of the first and second restoring units 20 and 30, respectively, using data stored in the header FIFO memory 51. The weighting matrix decoder 53 generates weighting matrices necessary for inverse quantization operations of the first and second inverse quantizers 23 and 33, respectively. Each weighting matrix is applied to the first and second inverse quantizers 23 and 33, respectively.

The operation of the FIG. 1 apparatus as constructed above will be described in detail involving a 4:2:0 picture format in the MPEG2 standard, with reference to FIGS. 2A to 5E.

The macroblock relating to the 4:2:0 picture format is composed of six blocks, in which one macroblock is encoded in sequence with Y1, Y2, Y3, Y4, Cu and Cv. Here, Y1–Y4 represent luminance blocks and Cu and Cv represent chrominance blocks.

The demultiplexer 11 of the data distributor 10 detects header data from data received from the variable length decoder (VLD; not shown), and outputs the detected header data to the header analyzer 50. The demultiplexer 11 also identifies the blocks of symbols supplied from the variable length decoder (not shown) based on the detected header data. The demultiplexer 11 supplies the blocks Y1, Y3 and Cu to the first FIFO memory 12, and supplies the blocks Y2, Y4 and Cv to the second FIFO memory 13. The first and second FIFO memories 12 and 13, respectively, output the blocks of symbols in the order in which their are input.

The analysis of header data for a particular macroblock is performed at a point in time preceding by one macroblock, comparing with that for a restoration operation of the symbols of the macroblock. Thus, the first and second restoring units 20 and 30, respectively, and the DC decoding unit 40 perform an operation with regard to data of the (m−1)-th macroblock MB(m−1) when the header FIFO memory 51 outputs data of the m-th macroblock MB(m). The timing relationship between the data output of the header FIFO memory 51 and the decoding operation of the first and second restoring units 20 and 30, respectively, is shown in FIGS. 2A and 2B.

The header FIFO memory 51 in the header analyzer 50 stores the header data supplied from the demultiplexer 11. The header decoder 52 reads out the header data stored in the header FIFO memory 51, decodes the read header data, and generates parameters including a macroblock start signal MB_START_DEC shown in FIG. 2D, a block start signal BLOCK_START shown in FIG. 2E, macroblock position information MB_COLUMN shown in FIG. 3D, intra-macroblock signal MB_INTRA shown in FIG. 3F and a macroblock pattern signal MB_PATTERN shown in FIG. 3G. The macroblock start signal MB_START_DEC represents a point in time when run level decoding and DC decoding begin. The macroblock position information MB_COLUMN which represents the order of macroblocks, is calculated using a macroblock escape and a macroblock address incremented by the variable length decoder. The weighting matrix decoder 53 restores data of the weighting matrix by using the header data output from the header FIFO memory 51, and the data of the weighting matrix is supplied to the first and second inverse quantizers 23 and 33, respectively.

The DC decoding unit 40 receives the parameters output from the header decoder 51 and the symbols output from the first and second FIFO memories 12 and 13, respectively. The DC decoding unit 40 detects macroblocks using the macroblock start signal MB_START_DEC shown in FIG. 3B supplied from the header decoder 52, and generates a macroblock count signal MB_COUNT, shown in FIG. 3C, which counts the number of the detected macroblocks. When the DC decoding unit 40 receives macroblock position information MB_COLUMN, shown in FIG. 3D, from the header decoder 52, the DC decoding unit 40 latches the information. Header data and coefficient data with respect to a skipped macroblock are not commonly transmitted. The header decoder 52 reads out from the header FIFO memory 51 the header data of the (m+3)-th macroblock next to a (m+1)-th macroblock if the (m+2)-th macroblock is a skipped macroblock as shown in FIG. 3A. The DC decoding unit 40 compares the macroblock position information MB_COLUMN with the macroblock count signal MB_COUNT. The DC decoding unit 40 resets a skipped detection signal SKIP_DEC to "0" if the two signals MB_COLUMN and MB_COUNT do not have the same value, and again resets the skipped detection signal SKIP_DEC to "1" if the two signals have the same value. That is, the DC decoding unit 40 causes a value of the skipped detection signal SKIP_DEC to be reset to "0" when the (m+2)-th macroblock is determined to be the skipped macroblock. As a result, the DC decoding unit 40 generates the skipped detection signal SKIP_DEC shown in FIG. 3E indicating that the skipped macroblock has been detected.

The DC decoding unit 40 latches the intra-macroblock signal MB_INTRA and the macroblock pattern signal MB_PATTERN supplied from the header decoder 52. The macroblock pattern signal MB_PATTERN shown in FIG. 3G has a value of "0" when all the symbols of blocks within the macroblock are "0". The DC decoding unit 40 generates an intra-macroblock detection signal MB_INTRA_DEC shown in FIG. 3H using the two latched signals. The DC decoding unit 40 determines a macroblock to be an "intra-macroblock" when a corresponding intra-macroblock signal MB_INTRA is "1". The DC decoding unit 40 determines a macroblock as an "inter-macroblock" if a corresponding macroblock pattern signal MB_PATTERN is "1" when the intra-macroblock signal MB_INTRA is "0", and determines the macroblock to be an "unnecessary macroblock for coding NOT_CODED" when both of the two signals are "0". As a result, the DC decoding unit 40 determines the types of macroblocks, as shown in FIG. 3I. Then, the DC decoding unit 40 performs the restoration operation with respect to DC coefficients of intra-macroblocks. This is because the DC coefficients of the intra-macroblock are processed differently from other coefficients in inverse quantization, and so on. On the contrary, the DC decoding unit 40 does not perform a decoding operation with respect to inter-macroblocks, skipped macroblocks and not-coded macroblocks. Accordingly, the decoding operation of the DC decoding unit 40 is in idle status (See FIG. 3J).

The first and second run level decoders 21 and 31, respectively, decode the symbols output from the FIFO memories 12 and 13, respectively, based on the parameters supplied by the header analyzer 50. In case of an intra-macroblock, the first and second run level decoders 21 and 31, respectively, perform a run-level-decoding operation based on the block start signal BLOCK_START shown in FIG. 2E supplied by the header decoder 52. The first and second scan converters 22 and 32, respectively, perform a scan conversion operation based on the block start signal BLOCK_START shown in FIG. 2E. FIG. 2F shows a timing diagram relating to the run-level-decoding operation of the first and second run level decodes 21 and 31, respectively, and FIG. 2G shows a timing diagram relating to the scan conversion operation of the scan converters 22 and 32.

Figure 4:
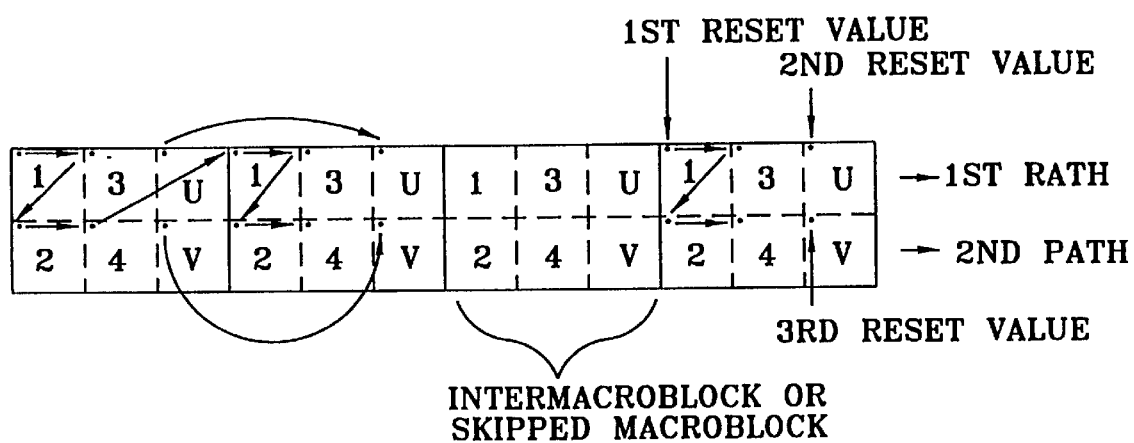
FIG. 4 is a conceptual diagram for explaining reset points in time of DC predictors within a macroblock.

The DC decoding unit 40 detects data involving the DC coefficients within blocks of the intra-macroblock among the symbols output from the first and second FIFO memories 12 and 13, respectively, on the basis of the macroblock type signal MB_TYPE shown in FIG. 2C or 3I. The DC decoding unit 40 starts to decode the DC coefficients according to the block start signal BLOCK_START output from the header decoder 52. The DC decoding unit 40 restores the DC coefficient of a first path, and then restores the DC coefficient of a second path after the decoding of the DC coefficient via the first path is complete. FIG. 2H shows a timing diagram relating to restoration of the DC coefficient. The DC decoding unit 40 restores an original DC coefficient by adding a DC component differential value of a DC component size to a DC predictor. In a syntax relating to the MPEG2 standard, the DC component size is represented as "DC_DCT_SIZE", and the DC component differential value is represented as "DC_DCT_DIFFERENTIAL". The first macroblock signal of a slice SLICE_ST_MB shown in FIG. 3K is set when a slice start signal SLICE_START_CODE is detected from the header data, and is reset when the next macroblock start signal MB_START_DEC is detected. Accordingly, "A" in FIG. 3L becomes a point in time to set a reset value of the DC predictor. Here, the reset value of the DC predictor is determined by DC coefficient precision INTRA_DC_PRECISION included in the picture coding extension PICTURE_CODING_EXTENSION. If the previous macroblock of a current macroblock is not an intra-macroblock, or the current macroblock is the first macroblock of a slice, the DC predictor of the luminance signal block Y1 is set to a first reset value, as shown in FIG. 4, and the DC predictors of the chrominance signal blocks Cu and Cv are reset to second and third values, respectively. The DC predictors of the luminance signal blocks Y2, Y3 and Y4 are set to the first reset value of the luminance signal block Y1. FIG. 2I shows a timing diagram of the DC coefficients of the intra-macroblock generated by the DC decoding unit 40.

The first and second inverse quantizers 23 and 33, respectively, inverse-quantize the data output by the first and second scan converters 22 and 32, respectively, using the data of the weighting matrix generated by the weighting matrix decoder 53. The output of the first inverse quantizer 23 is supplied to the first inverse DCT 24, and that of the second inverse quantizer 33 is supplied to the second inverse DCT 34. Referring to FIGS. 5A to 5E showing timing diagrams relating to the inverse DCTs 24 and 34, the first and second inverse DCTs 24 and 34, respectively, generate a macroblock start latching signal MB_START_LCH as shown in FIG. 5D, based on the macroblock start signal MB_START_DEC generated by the header decoder 52, and produces an intra-macroblock latching signal MB_INTRA_LCH as shown in FIG. 5E, based on the intra-macroblock start signal MB_INTRA_DEC. As shown in FIGS. 5C and 5D, the macroblock start latching signal MB_START_LCH is a one-block-period-delayed signal as compared with the macroblock start signal MB_START_DEC. The intra-macroblock latching signal MB_INTRA_LCH is a one-block-period-delayed signal rather than the intra-macroblock start signal MB_INTRA_DEC. Accordingly, the inverse DCTs 24 an 34, respectively, generate a block start latching signal BLOCK_START_LCH in order to latch the DC coefficients output from the DC decoding unit 40. At this time, the block start latching signal BLOCK_START_LCH is a signal in which decoding delay in the inverse quantizers 23 and 33 is considered. Thus, a timing relationship between blocks to be decoded by the inverse DCTs 24 and 34, respectively, and outputs of the inverse quantizers 23 and 33, respectively, is shown FIGS. 2K and 2L.

The FIG. 1 apparatus describes one embodiment for decoding header data and symbols in block units, but can be embodied in parallel process coded coefficients in a row unit of a block.

As described above, the dc decoding unit for a high-speed MPEG decoding apparatus according to the present invention can restore DC coefficients on a real-time basis by decoding DC coefficients of an intra-macroblock via a separate path with regard to other coefficients.

I claim:

1. A decoding apparatus for decoding symbols and header data obtained by variable length decoding, said decoding apparatus comprising:

a data distributor for receiving the symbols and alternately outputting blocks of the symbols via two output terminals;

a header analyzer for receiving the header data, analyzing the received header data and outputting parameters relating to restoration of the symbols;

a DC component decoder for detecting symbols relating to DC coefficients of an intra-macroblock among the symbols output from said data distributor, and restoring the DC coefficients of the intra-macroblock, using the detected symbols and the parameters supplied from said header analyzer; and first and second restoring units, individually connected to the two output terminals of said data distributor, for restoring the blocks of the symbols output by said data distributor, using the parameters generated by said header analyzer and a corresponding DC coefficient of the DC coefficients produced by said DC component decoder.

2. The decoding apparatus according to claim 1, wherein said header analyzer comprises a FIFO memory for storing the header data output from said data distributor;

a header decoder for decoding the header data stored in said FIFO memory and generating parameters; and a weighting matrix decoder for restoring information of a weighting matrix for inverse quantization with the header data stored in said FIFO memory.

3. The decoding apparatus according to claim 1, wherein said DC component decoder restores a DC coefficient corresponding to each of blocks constituting an intra-macroblock.

4. The decoding apparatus according to claim 1, wherein said DC component decoder judges whether a macroblock composed of the received symbols is an intra-macroblock, using the parameters output from said header analyzer and the symbols output from said data distributor, restores the DC coefficients individually corresponding to blocks composed of the symbols contained in the intra-macroblock, and supplies the restored data to said first and second restoring units.

5. The decoding apparatus according to claim 1, wherein each of said first and second restoring units comprises an inverse discrete cosine transformer using the DC coefficients restored by said DC component decoder as the DC coefficient values of corresponding blocks within the intra-macroblock.

* * * * *